US007101484B2

(12) United States Patent
Betenekov et al.

(10) Patent No.: US 7,101,484 B2
(45) Date of Patent: Sep. 5, 2006

(54) SR-90/Y-90 RADIONUCLIDE GENERATOR FOR PRODUCTION OF HIGH-QUALITY Y-90 SOLUTION

(75) Inventors: Nikolai D. Betenekov, Ekaterinburg (RU); Leonid M. Sharygin, Zarechny (RU); Roy W. Brown, Placitas, NM (US)

(73) Assignee: TC International Inc, Albuquerque, NM (US)

( * ) Notice: Subject to any disclaimer, the term of this patent is extended or adjusted under 35 U.S.C. 154(b) by 217 days.

(21) Appl. No.: 10/830,916

(22) Filed: Apr. 23, 2004

(65) Prior Publication Data

US 2005/0236331 A1 Oct. 27, 2005

(51) Int. Cl.
*B01D 15/08* (2006.01)

(52) U.S. Cl. .......................... 210/635; 210/656; 423/2; 423/21.1; 423/21.5; 423/155; 423/157

(58) Field of Classification Search ................ 210/635, 210/656, 659, 198.2; 423/2, 21.1, 21.5, 155, 423/157
See application file for complete search history.

(56) References Cited

U.S. PATENT DOCUMENTS

| | | | | |
|---|---|---|---|---|
| 5,368,736 | A * | 11/1994 | Horwitz et al. | 210/635 |
| 5,494,647 | A * | 2/1996 | Huntley | 423/2 |
| 6,337,055 | B1 * | 1/2002 | Betenekov et al. | 423/2 |
| 2003/0231994 | A1 * | 12/2003 | Sylvester | 423/3 |

* cited by examiner

*Primary Examiner*—Ernest G. Therkorn
(74) *Attorney, Agent, or Firm*—Robert W Becker & Associates; Robert W Becker

(57) ABSTRACT

A process for purifying a stock Sr-90 solution containing stable and radioactive impurities, holding the purified Sr-90 solution for Y-90 ingrowth, and subsequently extracting the Y-90 from the Sr-90/Y-90 solution. The stock solution is sequentially passed through two thermoxide-type sorbents (T-3 and T-5), which hold the impurities while passing the Sr-90 solution. After ingrowth of Y-90, the Sr-90/Y-90 solution is passed through sorbent T-3, which preferentially sorbs the Y-90 while passing the Sr-90 solution. The Y-90 is then eluted from the T-3 sorbent. The T-3 and T-5 sorbents are specially prepared compounds of zirconium dioxide and titanium dioxide, respectively, that preferentially sorb Y-90 under predetermined conditions of solution pH and NaCl concentration.

9 Claims, 2 Drawing Sheets

Stage 2: Extraction of Y-90

Fig. 1 Stage 1: Purification of Sr-90 Stock Solution
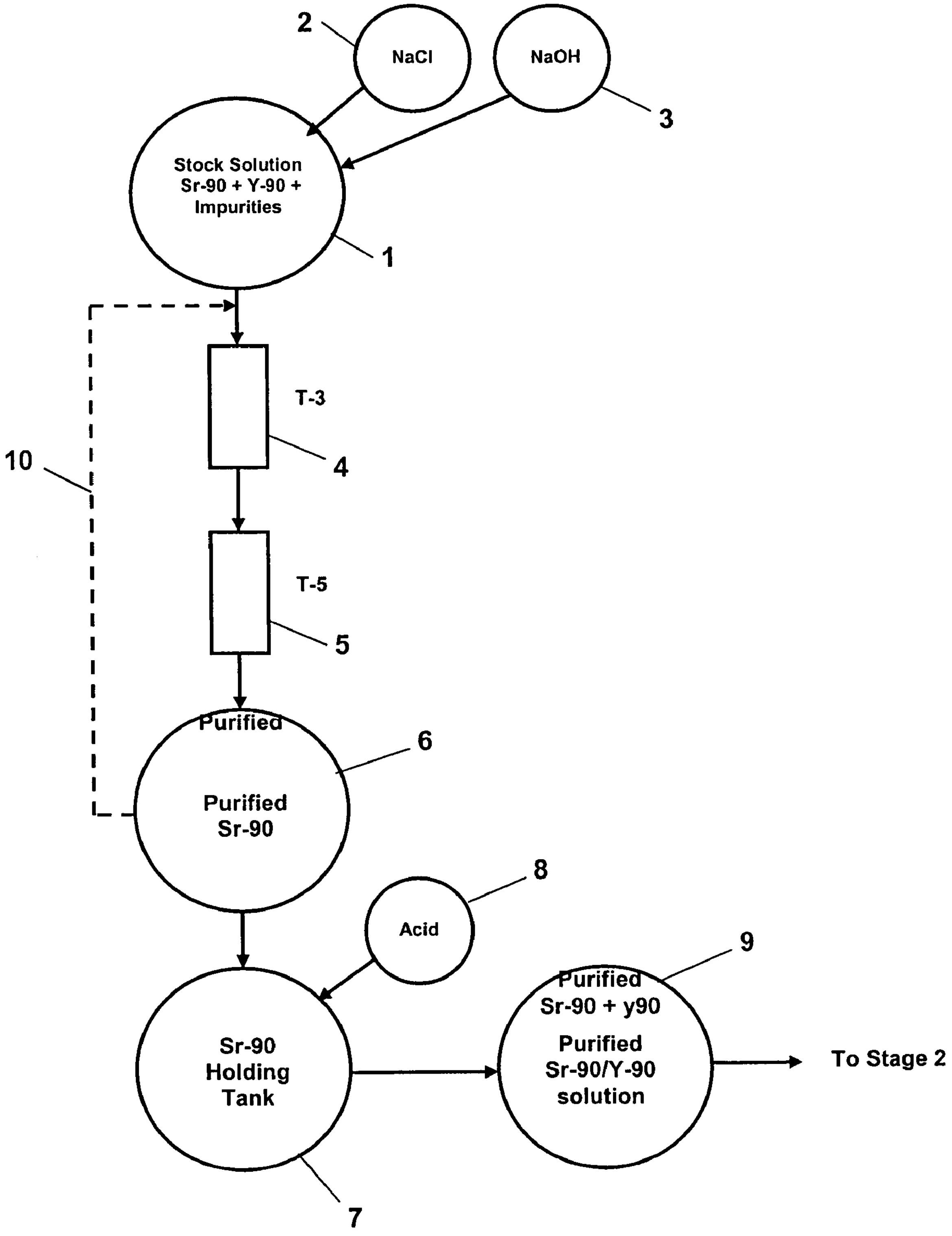

FIG. 2 Stage 2: Extraction of Y-90
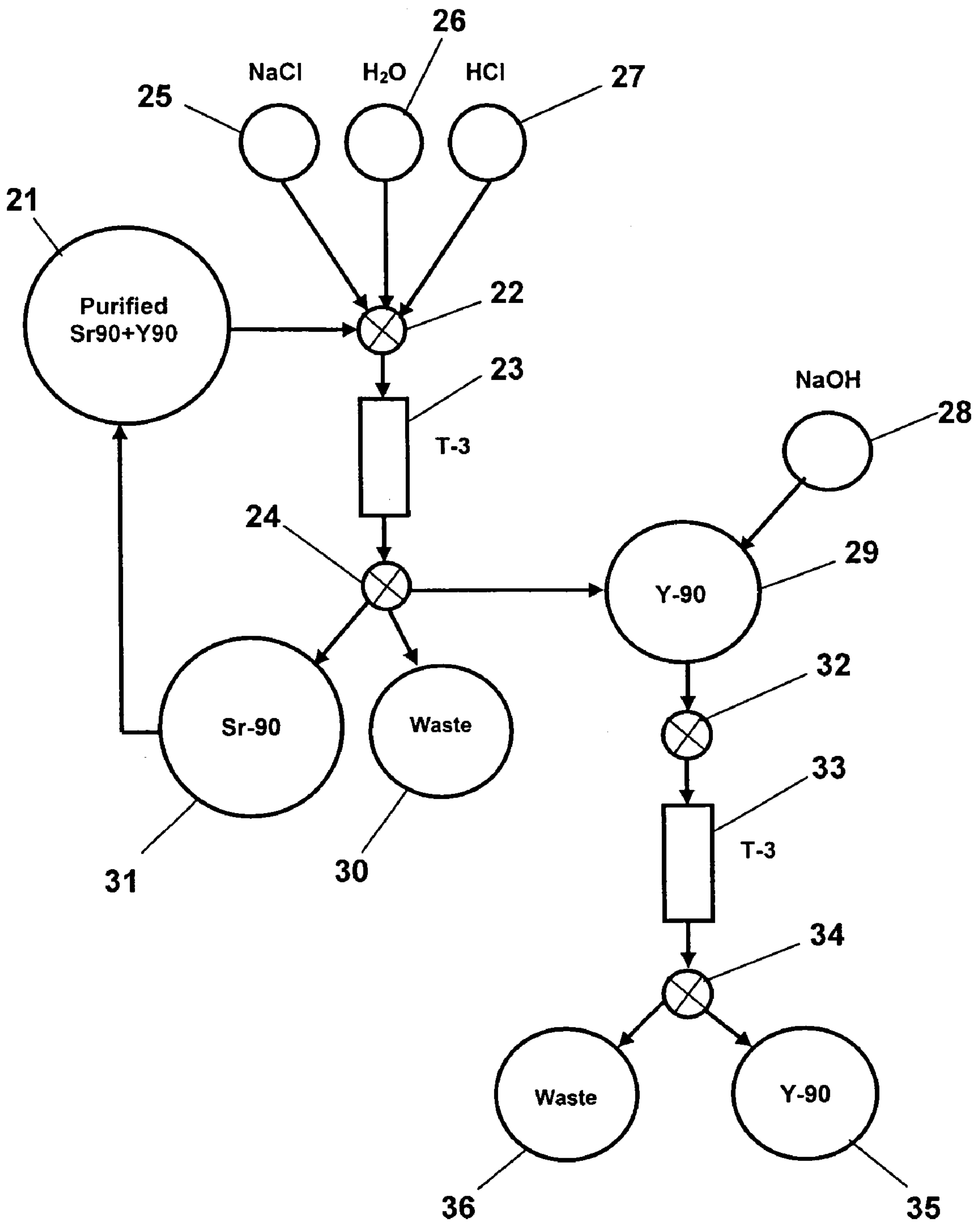

SR-90/Y-90 RADIONUCLIDE GENERATOR FOR PRODUCTION OF HIGH-QUALITY Y-90 SOLUTION

BACKGROUND OF THE INVENTION

The invention relates generally to a new process for the purification of a stock solution of Strontium-90 and the subsequent separation of ingrowth Yttrium-90 from the purified Strontium-90 solution. Multi-Ci quantities of Yttrium-90 can be generated of sufficient quality for medical applications while minimizing the amount of waste generated.

Yttrium-90 (Y-90 ) is a radioactive nuclide used in medicine as a biological tracer and for treating cancer, arthritis, and arterial restenosis. Y-90 is a short-lived daughter product of the radioactive isotope strontium-90 (Sr-90). It decays with a relatively short half-life of 64.2 hours to stable zirconium-90 via high-energy β-decay. The Sr-90 isotope itself is one of the many byproducts of the decay of uranium fission reactors. It has a half-life of 29.1 years. The decay of Sr-90 proceeds according to the following scheme:

$$^{90}\mathrm{Sr} \xrightarrow[29\ \mathrm{yr}]{} {}^{90}\mathrm{Y} + \mathrm{B}^{-}\ (0.54\ \mathrm{MeV})$$

$$^{90}\mathrm{Y} \xrightarrow[64\ \mathrm{hr}]{} {}^{90}\mathrm{Zr} + \mathrm{B}^{-}\ (2.28\ \mathrm{MeV})$$

It is desirable to produce Y-90 with minimal contamination with the parent radioisotope, Sr-90 . This is particularly important for medical applications since Sr-90 is extremely toxic. The Y-90 produced should also be free of toxic metal ions and other radioactive isotopes commonly found in stock solutions of Sr-90 coming from nuclear reactors since these impurities would interfere with radiolabeling applications. For commercial purposes, the Y-90 extraction process should be uncomplicated, be relatively quick due to the short half-life of Y-90, produce multi-Ci quantities of Y-90, , and minimize the radioactive waste generated.

The most common process currently in use for extracting Y-90 from Sr-90 employs ion-exchange methods. However, ion-exchange resins are subject to radiation damage and are generally only suitable for sub-Ci quantities of Y-90 . Furthermore, to achieve acceptable Y-90 yields often requires long ion-exchange columns and large volumes of eluent. Other methods of extracting Y-90 from Sr-90 include solvent extraction, precipitation, and various forms of chromatography. Solvent extraction methods are complicated and typically produce volumes of liquid organic waste contaminated with Sr-90. None of these methods meet all of the desirable characteristics enumerated above.

Accordingly, a need exists for an uncomplicated method of generating Y-90 that produces a pure, high yield product suitable for medical applications, while at the same time minimizing waste products.

SUMMARY OF THE INVENTION

In a preferred embodiment, the invention provides high quality extraction of multi-curie quantities of Yttrium-90 from a stock solution of Strontium-90. Radioactive and chemical impurities are first removed from the stock solution by adjusting the solution to a NaCl concentration of 1-mole/liter and adjusting the acidity to a pH of 3.5 to 4. It is then sequentially passed through two thermoxide-type sorbents (T-3 and T-5), which hold the impurities while passing the Sr-90 solution. This step may be repeated depending upon the design requirements. The acidity of the purified Sr-90 solution is reduced through contact with the sorbents and must be raised to the pH=3–4 range in a holding tank. This Sr-90 solution is held for approximately two weeks to permit the ingrowth of Y-90 to an equilibrium condition.

In the second stage of the process, Y-90 is extracted from the Sr-909090 solution. The solution is passed through a chromatographic column of T-3 sorbent that preferentially sorbs the Y-90 while passing the Sr-90 solution. The Sr-90 solution may then be reused. The sorbent containing the Y-90 is first washed with a NaCl solution to remove any Sr-90 traces, then washed with distilled water to remove the NaCl solution, and finally the Y-90 is eluted using an HCl solution. A Y-90 to Sr-90 separation factor as high as $10^4$ is possible with a single T-3 pass. For this reason, a second pass of the recovered Y-90 solution through another T-3 chromatographic column after neutralizing the excessive acidity may be used to further purify the Y-90 solution. The T-3 and T-5 thermoxide-type sorbents used are specially prepared compounds of zirconium dioxide and titanium dioxide, respectively.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 1 is a schematic showing the process for purifying a stock solution of Stontium-90.

FIG. 2 is a schematic showing the process for extracting Yttrium-90 from a purified Sr-90/Y-90 solution.

DESCRIPTION OF SPECIFIC EMBODIMENTS

The present invention purifies and extracts Y-90 from a stock Sr-90 solution in a two-stage process. The first stage removes the stable and radioactive impurities of the initial strontium-containing solution by the sequential filtration of the solution through a first chromatographic column containing zirconium dioxide (T-3) sorbent followed by a second chromatographic column containing titanium dioxide (T-5) sorbent. The thus purified Sr-90 solution is held in a reservoir for Y-90 ingrowth. This Sr-90 /Y-90 solution is then passed through another T-3 column, which selectively sorbs the Y-90 while passing the Sr-90 solution. The non-absorbed Sr-90 solution may then be returned to the purified Sr-90 reservoir and reused in a subsequent extraction cycle. The Y-90 held in the T-3 sorbent is next desorbed from the sorbent directly into a commercially useful form.

The ability of the granular thermoxide-type sorbents to quantitatively separate Y-90 from a solution of Sr-90 and Y-90 depends on their capability to preferentially sorb Y-90 under certain conditions. These conditions include: the difference in sorption behavior of the two isotopes at different pH levels; the sorbent synthesis process; the concentration of sorbate and saline background; and the concentration of complexing agents. The optimum conditions under which these dioxide sorbents would best separate Y-90 from Sr-90 were determined.

Stage 1: Purification of the Sr-90 stock solution.

The Sr-90 stock solution is delivered by a manufacturer in an acidic medium with an HCl concentration of 0.1–2.5 mole/liter. Typically the Sr-90 stock solution will have an HCl concentration of 0.1 mole/liter (pH=1) and have the same volume specific activity for the Sr-90 and Y-90 of ≧500 mCi/ml. The composition of the Sr-90 stock solution, held in a stock solution tank 1 (see FIG. 1), is first adjusted by adding a calculated quantity of NaCl 2 and a small amount of alkaline 3 (NaOH) to reach the following parameters: a concentration of NaCl of $C_{NaCl}$=1 mole/liter and a pH=3.5–4.0. A volume=5–10 ml was used in this example. The concentrations of the chemical elements strontium and yttrium in the stock solution may be in the following ranges: $C_{Sr}$=2–7 mg/ml and $C_Y$=0.1–0.5 μg/ml. A pH meter is used to monitor the solution pH.

The thus adjusted stock solution is first sent through a chromatographic column containing T-3 sorbent. For the volume mentioned, the column used had a diameter of 4 mm, a sorbent loading height of 8 cm, and a filtration rate of 2–4 ml/min-cm$^2$. The zirconium dioxide (T-3) sorbent, as well as the titanium dioxide (T-5) sorbent, are produced by the Thermoxide Company. Experimental samples of these sorbents were produced in spherical granular form with temperature treatments of 100, 400, 600, 850, and 1000° C. using the sol-gel method. Russian patents protect the chemical compositions and manufacturing processes used to produce these sorbents. The preferred sorbent (T-3) for the first chromatographic column 4 is zirconium dioxide ($ZrO_2$) stabilized with 2–6 mole-percent yttrium oxide ($Y_2O_3$). The T-3 sorbent is in the form of 60–100 μm spherical particles produced by thermal treatment of hydrated zirconium dioxide at 850–1200° C. over a period of 2 to 6 hours. It has a pH=6.0 in a 1-mole/liter NaCl solution. This sorbent primarily acts as a mechanical and sorption filter.

The solution is next passed through a second chromatographic column 5 containing T-5 sorbent. For the volume mentioned, the column has a 6-mm diameter, sorbent loading height of 8 cm, and a filtration rate of 2–4 ml/min-cm$^2$. The preferred sorbent is titanium dioxide ($TiO_2$) stabilized with about 3–5 mole-percent $ZrO_2$. The T-5 sorbent is in the form of 200–400 μm spherical particles obtained by thermal treatment of hydrated titanium dioxide at 300–500° C. over a period of 2 to 6 hours. It has a pH=6.3 in a 1-mole/liter NaCl solution. The T-5 sorbent sorbs stable and radioactive ions. Together these sorbents remove colloidal and suspended radioactive and chemical impurities while passing the thus purified Sr-90 solution.

The filtrate is accumulated in a purified Sr-90 solution tank 6. An aliquot of the solution is taken for analytical and radiometric control. Depending on the control results and the design requirements, the solution either is recycled for re-purification 10 or sent to a holding tank 7 for pH correction. After contacting the sorbent, the filtrate's pH is increased up to 5.5–6.0. In order to avoid Y-90 losses to sorption by the tank walls and to prevent formation of colloids due to the lengthy holding time in a neutral solution, the acidity in the holding tank 7 solution must be increased to a pH of 3 to 4. Acid from an acid tank 8 is thus added at the beginning of the holding period.

Because these sorbents remove practically all of the Sr-90 's daughter radionuclide Y-90, as well as the stock solution impurities, the purified Sr-90 must be held for a period of time to permit Y-90 accumulation. The preferred holding period is approximately two weeks, at which time the Y-90 accumulation reaches equilibrium with the Sr-90. After the two-week holding period, the Sr9090 solution 9 is ready for stage 2, the extraction of the Y-90. The first stage purification stage described above results in a purified Sr-90 solution that can be used for multiple cycles of high quality Y-90 extraction, as described in stage 2 below, with no additional purification required except for the removal of Sr-90.

Stage 2: Extraction of Y-90 From the Purified Sr9090 Solution.

The purified equilibrium solution of Sr-90/Y90 held in the holding tank (9 in FIG. 1 and 21 in FIG. 2) has the following parameters for the example given: $C_{Sr}$=5–10 mg/ml, $C_Y$=0.1–0.5 μg/ml, $C_{NaCl}$=1 mole/liter, Volume=5 ml, pH=3.4–4.0. Referring to FIG. 2, this solution is fed via valve 22 through chromatographic column 23 containing Thermoxide-type sorbent T-3. The T-3 characteristics are the same as previously enumerated in stage 1, except for the particle size, which in this case is 60–400 μm. Through valve 24 Sr-90 is accumulated into an Sr-90 tank 31, where it can be sent to the holding tank 21 for reuse after first adjusting the pH to 3.5–4.0 with the titrated acid solution from the acid tank 27 (connection not shown). The Y-90 is sorbed by the T-3 sorbent.

The T-3 sorbent is first washed with 1-mole/liter NaCl solution from a NaCl tank 25 to remove any traces of Sr-90 . About 5 ml of 1 mol/liter of NaCl solution with a pH=5–7 is used in this example. The sorbent column is then washed with 5–7 ml of distilled water from water tank 26 to remove any remaining NaCl. The NaCl and water solutions are accumulated in a waste tank 30. The Y-90 is then desorbed with a 0.04 mole/liter HCl solution from a HCl tank 27 and held in the Y-90 accumulation tank 29. The acidity of the Y-90 eluate is reduced to a pH=3.5–4.0 by adding a calculated amount of an alkaline solution (NaOH) held in the NaOH tank 28. Sodium chloride 25 is also added to this solution to reach 1 mol/liter concentration (connection not shown). This Y-90 solution may then be passed via valve 32 through a third T-3 chromatographic column 33 for a second Sr-90/Y-90 separation process cycle to obtain Y-90 of even higher purity. The NaCl and distilled water washes are again used, followed by desorption of Y-90 from the third T-3 sorbent by HCl. Valve 34 directs the NaCl and water wastes to the waste tank 36 while the Y-90 desorbed using HCl is accumulated in the final product tank 35. A third separation stage may be added if even higher quality is desired.

What is claimed is:

1. A process for separating radioactive isotope yttrium-90 from a stock solution containing radioactive strontium-90, , the stock solution having colloidal and suspended radioactive and chemical impurities, the process comprising:

a. adjusting said stock solution composition by adding a calculated quantity of sodium chloride and alkaline, whereby the solution is brought to a NaCl concentration of approximately 1 mole/liter and has a pH in the range of 3.5 to 4.0;

b. passing said adjusted stock solution through a first chromatographic column containing a first thermoxide-type sorbent;

c. passing said adjusted stock solution through a second chromatographic column containing a second thermoxide sorbent, whereby colloidal, suspended and ion forms of radioactive and chemical impurities are held in said first and second thermoxide-type sorbents and a purified Sr-90 filtrate is passed into a Sr-90 filtrate tank;

d. testing said purified Sr-90 filtrate for purity and passing it to a Sr-90 holding tank if purity requirements are met or re-passing it through said first and second thermoxide-type sorbents a second time;

e. adjusting the pH of said purified Sr-90 filtrate in said Sr-90 holding tank to approximately 3 to 4;

f. holding said purified Sr-90 filtrate in said Sr-90 holding tank to permit the ingrowth of Y-90 forming a Sr-90/Y-90 solution;

g. passing said strontium-90/yttrium-90 solution through a third chromatographic column containing said first thermoxide-type sorbent, whereby Y-90 is preferentially sorbed while Sr-90 solution is passed through said third chromatographic column and held in an intermediate holding tank for subsequent reuse;

h. washing said first thermoxide-type sorbent of the third chromatographic column with a NaCl solution to thereby remove any remaining traces of Sr-90 and thereafter passing said NaCl solution to a waste tank;

i. washing said first thermoxide-type sorbent of the third chromatographic column with a distilled water solution to thereby remove any remaining NaCl and thereafter passing said water solution to said waste tank;

j. eluting the Y-90 from said first thermoxide-type sorbent of the third chromatographic column with HCl acid and accumulating the acidic Y-90 solution in a first Y-90 tank;

k. passing said acidic Y-90 solution after pH correction from the first Y-90 tank through a fourth chromatographic column containing said first thermoxide-type sorbent, whereby Y-90 is preferentially sorbed by said sorbent;

l. repeating said h, i, and j steps while accumulating the acidic Y-90 solution in a second Y-90 tank, this Y-90 solution constituting the final product.

2. The process as set forth in claim 1 wherein said Sr-90 solution is passed through said first and second thermoxide-type sorbents at a rate of 2 to 4 ml/min-cm$^2$.

3. The process as set forth in claim 1 wherein said first thermoxide-type sorbent of said first chromatographic column is T-3, a zirconium dioxide sorbent stabilized with yttrium oxide or with an alkaline-earth element oxide in the amount of 2–6 mole percent and produced by the thermal treatment of hydrated zirconium dioxide at between 850 and 1200° C. for two to six hours, and further in the form of approximately 60–100 micrometer spherical particles, and further said first thermoxide-type sorbent of said third and fourth chromatographic columns is T-3 in the form of approximately 60–400 micrometer spherical particles.

4. The process as set forth in claim 3 wherein said T-3 sorbent is thermally treated at approximately 850° C.

5. The process as set forth in claim 1 wherein said second thermoxide-type sorbent is T-5, a titanium dioxide sorbent stabilized with zirconium dioxide in the amount of 3–5 mole percent and produced by the thermal treatment of hydrated titanium dioxide at between 300–500° C. for two to six hours, and further in the form of 200–400 μm spherical particles.

6. The process as set forth in claim 1 wherein the holding period of Sr-90 solution in the Sr-90 holding tank is for a period of approximately two weeks to permit the resulting Sr-90/Y-90 solution to reach an equilibrium state.

7. The process as set forth in claim 1 wherein said first thermoxide-type sorbent NaCl wash is by a 0.5 to 1.5-mole/liter NaCl solution.

8. The process as set forth in claim 1 wherein said Y-90 is eluted from the third and fourth chromatographic columns using a 0.04 to 0.1-mole/liter HCl solution.

9. The process as set forth in claim 1 comprising an additional step of adjusting said hydrochloride yttrium-90 eluate from the third chromatographic column by neutralizing to a pH of 2.5 to 5 and bringing the NaCl concentration to 0.5 to 1.5-mol/liter.

* * * * *